(12) United States Patent
Kral et al.

(10) Patent No.: US 12,515,224 B2
(45) Date of Patent: Jan. 6, 2026

(54) METHODS, SYSTEMS AND APPARATUS FOR PLANT MATERIAL SCREENING AND PROPAGATION

(71) Applicant: Phytoform Labs Ltd., Harpenden (GB)

(72) Inventors: Nicolas Kral, Harpenden (GB); William Pelton, Harpenden (GB)

(73) Assignee: Phytoform Labs Ltd., Harpenden (GB)

( * ) Notice: Subject to any disclaimer, the term of this patent is extended or adjusted under 35 U.S.C. 154(b) by 316 days.

(21) Appl. No.: 17/604,211

(22) PCT Filed: Apr. 20, 2020

(86) PCT No.: PCT/GB2020/050983
§ 371 (c)(1),
(2) Date: Oct. 15, 2021

(87) PCT Pub. No.: WO2020/212713
PCT Pub. Date: Oct. 22, 2020

(65) Prior Publication Data
US 2022/0192121 A1  Jun. 23, 2022

(30) Foreign Application Priority Data
Apr. 18, 2019 (GB) ...................... 1905542

(51) Int. Cl.
*A01H 4/00* (2006.01)
*B01L 3/00* (2006.01)
*G01N 33/58* (2006.01)

(52) U.S. Cl.
CPC ........ *B01L 3/502784* (2013.01); *A01H 4/002* (2021.01); *A01H 4/005* (2013.01); *B01L 3/502715* (2013.01); *G01N 33/582* (2013.01)

(58) Field of Classification Search
None
See application file for complete search history.

(56) References Cited

U.S. PATENT DOCUMENTS

2005/0241016 A1* 10/2005 Mach ................. C12N 15/8242
800/278

FOREIGN PATENT DOCUMENTS

| CN | 106190779 A | 12/2016 | |
|---|---|---|---|
| WO | 2014039970 A1 | 3/2014 | |
| WO | 2017218486 A1 | 12/2017 | |
| WO | WO-2018071448 A1 * | 4/2018 | ........ B01L 3/502761 |

OTHER PUBLICATIONS

Giri et al (Alginate encapsulation technique for indica rice protoplast culture and plant regeneration. Current Science 67, 542-545, 1994) (Year: 1994).*
Yu et al (Droplet-based microfluidic analysis and screening of single plant cells. PLOS One. p. 1-15,2018) (Year: 2018).*
Lei et al (A simple and effective method to encapsulate tobacco mesophyll protoplasts to maintain cell viability. MethodsX. 24-32, 2015) (Year: 2015).*
Haner et al (Synthesis of a New Chelating Gel: Removal of Ca2+ Ions from Parvalbumin Analytical Biochemistry 229-234, 1984). (Year: 1984).*
Hati et al (Versatile, cell and chip friendly method to gel alginate in microfluidic devices. Lab Chip, 16, 3718-3727, 2016). (Year: 2016).*
Grasso et al. "Microbead encapsulation of living plant protoplasts: a new tool for the handling of single plant cells." Applications in Plant Sciences 4(5): 1500140 pp. 1-5 (2016).
Ryu et al. "Single-cell RNA sequencing resolves molecular relationships among individual plant cells." Plant Physiology 179(4): 1444-1456 (2019).
Yu et al. "Droplet-based microfluidic analysis and screening of single plant cells." PLOS One 13(5): e0196810 pp. 1-15 (2018).
Kageyama et al. "Plant regeneration from patchouli protoplasts encapsulated in alginate beads." Plant Cell, Tissue and Organ Culture 41(1): 65-70 (1995).

* cited by examiner

*Primary Examiner* — Wayne Zhong
(74) *Attorney, Agent, or Firm* — NIXON PEABODY LLP; David S. Resnick; Jeanne N. Jodoin

(57) ABSTRACT

Provided are methods and systems for propagating plant material and the plant cells obtained thereby. The method comprises providing a solution comprising a plurality of plant protoplasts comprising an encapsulation medium or encapsulation medium precursor, introducing the solution into a microfluidic device, forming droplets of the solution in the microfluidic device, at least some of which encapsulate a single protoplast, causing the encapsulation medium or encapsulation medium precursor to gelify in the microfluidic device, and collecting the encapsulated protoplasts. The system comprises a microfluidic device comprising a droplet generator, a first injection system comprising a first liquid and configured for injecting the first liquid into the droplet generator, and a second injection system comprising a second liquid and configured for separately injecting a second liquid that is immiscible with the first liquid into the droplet generator. The first liquid is a solution comprising protoplasts and the first liquid comprises an encapsulation medium or encapsulation medium precursor, and the system is configured such that droplets are formed in the droplet generator, each droplet enclosing a single or no protoplast and comprising the encapsulation medium or encapsulation medium precursor. The encapsulation medium or encapsulation medium precursor in the droplets is gelified in the microfluidic to generate gelified droplets enclosing a single or no protoplast.

13 Claims, 6 Drawing Sheets

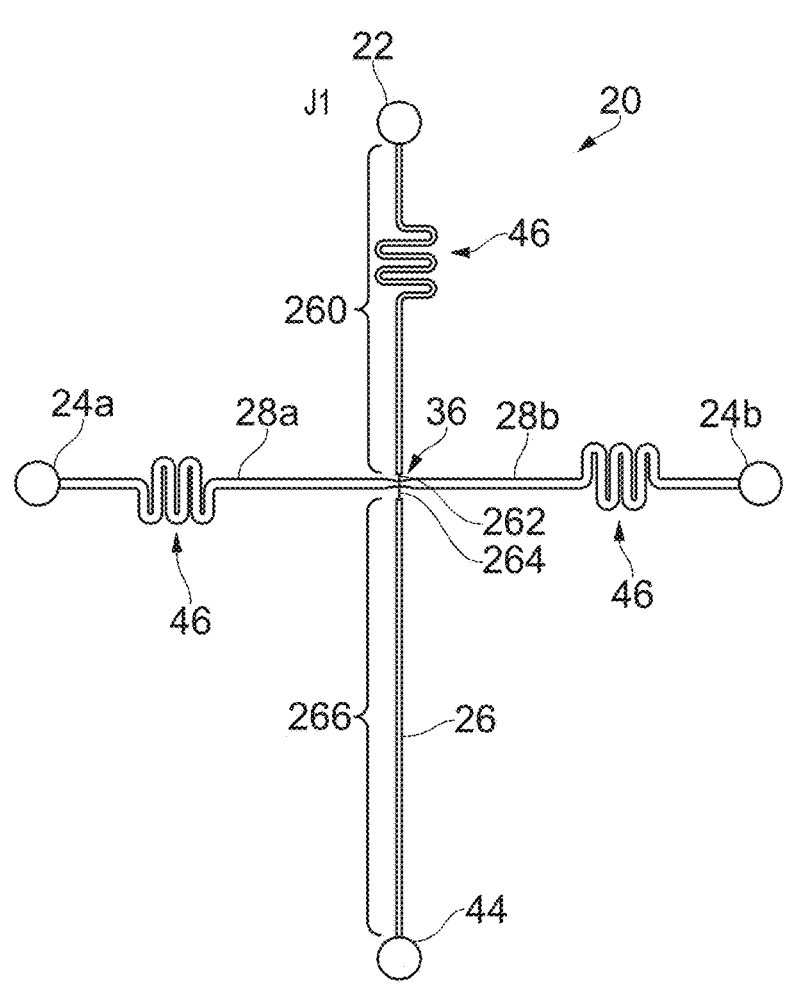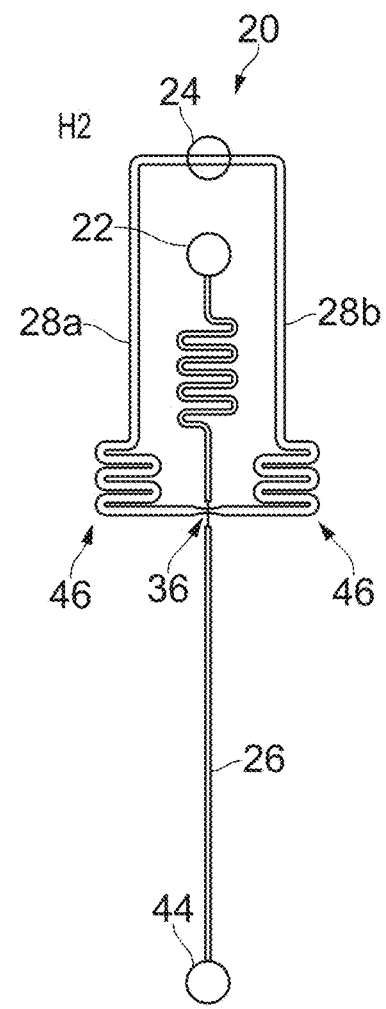
FIG. 3B
FIG. 3C

METHODS, SYSTEMS AND APPARATUS FOR PLANT MATERIAL SCREENING AND PROPAGATION

CROSS-REFERENCE TO RELATED APPLICATIONS

This application is a 35 U.S.C. § 371 National Phase Entry Application of International Application No. PCT/GB2020/050983 filed Apr. 20, 2020, which designates the U.S. and claims benefit under 35 U.S.C. § 119 (b) of G.B. Application No. 1905542.5 filed Apr. 18, 2019, the contents of which are incorporated herein by reference in their entireties.

FIELD OF THE INVENTION

The present invention relates to the field of plant engineering. In particular, the present invention relates to methods, systems and apparatus for modifying, selecting and propagating plant material.

BACKGROUND OF THE INVENTION

Plant genetic engineering, selection and propagation form an essential part of modern horticulture and agriculture. Recent studies have proved that it is possible to deliver protein complexes such as Cas9 and other reagents into plant protoplasts (see e.g. Woo et al., 2015, Liang et al., 2016, or Malnoy et al., 2016) thereby opening the door to new avenues in plant engineering. However, this is currently hindered by difficulties in screening plants for the presence of a modification of interest, in combination with low survival rates of modified protoplasts. As a result, the recovery of whole gene edited plants is very low.

Microfluidics has been proposed as a potential approach to rapid phenotyping of plant systems (Yu et al., 2017). This system relies on the use of a microfluidic chip to separate single protoplasts in individual aqueous droplets which are then sorted based on fluorescence signals. However, the cell survival rate in this system is low and, as such, the subsequent recovery of viable plants is highly inefficient or even impossible. This problem is particularly prominent in combination with genetic engineering and gene editing processes that themselves have an impact on cell survival and that may have low transformation efficiency. Indeed, in such cases, efficient selection and high recovery of transformed plants is particularly important. As such, the modification and selection of plants using such technologies is currently far too inefficient to be commercially applicable.

WO2018/071448 A1 describes microfluidic systems and methods to generate and analyse microcapsules comprising biological samples such as single cells or protoplasts. Microcapsules comprising the biological sample can be preserved by a polymerisation process that forms a hydrogel around the biological sample. However, the polymerisation of encapsulating gel is complex, only occurring with the introduction of a third reagent as a separate phase. The polymerisation agent is calcified oleic acid which is not able to produce uniform polymerisation and this in conjunction with the calcified oleic acid being dispensed from only one axis makes uniform polymerisation impossible. The separation of cells requires external components (filter paper) to be achieved. Further, detection of fluorescence in cells only occurs by trapping cells in microwells, meaning that cells cannot be quickly sorted and separated efficiently or quickly. The described devices and methods lack suitability for the recovery of plant cells to whole plants.

WO 2017/218486 A1 relates to methods and compositions for the emulsification of solid supports (such as polymers or aluminium or steel metal) in deformable gel beads. In some embodiments single solid supports are encapsulated with a single cell in a droplet. This device does not aim to protect plant cells or increase the efficiency of cell to whole plant regeneration and does not encompass within-device detection of fluorescence, or encapsulated cell sorting.

CN106190779 describes a single-cell isolation and encapsulation device and method based on a micro-fluidic chip. This document is focused on medical applications and lacks suitability for use with plant cells. The cell encapsulation reagent is primarily composed of a buffer and no hydrogels are used. Chemical measures to protect and support plant cells from single cells to whole plants are not described, and any ability to carry out fluorescence detection or cell sorting functionality is also absent.

Yu et al. ("Droplet-based microfluidic analysis and screening of single plant cells" *PLoS ONE* 13(5): e0196810. May 2018), describes high-throughput characterisation and sorting of plant protoplasts encapsulated individually in aqueous microdroplets, based on the genetic expression of a fluorescent reporter protein. No disclosure is made of successful methods to protect single plant cells or improve the efficiency of regenerating them back to whole plants. Rather, the device is purely diagnostic, lacking any regenerative encapsulation and consequently permits only a very low likelihood of regeneration. The cell encapsulation and then sorting by fluorescent signature also occurs on two different devices as it is complex to connect them, leading to increased risk of damage and/or contamination.

Similarly, Grasso and Lintilhac ("Microbead encapsulation of living plant protoplasts: A new tool for the handling of single plant cells", *Applications in Plant Sciences* 2016 4(5): 1500140) provides a protocol for the incorporation of individual plant protoplasts into precisely sized agarose microbeads. No effort is made to improve the efficiency of regenerating whole plants form the single cells, or to sort cells based on their fluorescent signature. Hydrogel chemistry is used that will lower single plant cell viability and is inefficient in encapsulating cells, with the result that capsules are produced wherein only 25% contain cells.

Therefore, there is still a need for new, and more efficient ways of selecting, modifying and recovering plants, particularly plants subjected to gene engineering or editing processes.

SUMMARY OF THE INVENTION

In one aspect, the invention relates to a system comprising a microfluidic chip that allows recovery of plant protoplasts and propagation into whole plants with high efficiency. Protoplasts introduced in the microfluidic chip are guided through microfluidic channels that separate out the cell solution into single cells which are then encapsulated in a media which protects and provides nutrition to the protoplasts. As a result, the viability of the resulting protoplasts is greatly increased and so is the efficiency of recovery of whole plants from these protoplasts.

In particular, the invention provides a system for propagating plant material, the system comprising a microfluidic device comprising a droplet generator, a first injection system comprising a first liquid and configured for injecting the first liquid into the droplet generator, and a second injection system comprising a second liquid and configured for separately injecting a second liquid that is immiscible with the first liquid into the droplet generator. The first liquid is a solution comprising protoplasts and the first liquid comprises an encapsulation medium or encapsulation medium precursor. The system is configured such that droplets are formed in the droplet generator, each droplet enclosing a single or no protoplast and comprising the encapsulation medium or encapsulation medium precursor. The system is further configured such that the encapsulation medium or encapsulation medium precursor in the droplets is gelified in the device to generate gelified droplets enclosing a single or no protoplast.

In embodiments, the system additionally comprises means to screen the protoplasts in the microfluidic device based on a characteristic such as fluorescence signature. The encapsulated cells positively selected can be guided out of the microfluidic device and deposited onto medium that sustains cell division and growth. This radically increases the chance of the correct cells being selected for, reducing the amount of screening necessary post recovery of the plants.

In embodiments, the microfluidic device is a microfluidic chip.

In particular, the system may further comprise a first detection system and a first sorting system downstream of the droplet generator, wherein the first detection system is configured to detect the presence of chlorophyll in a droplet passing through the microfluidic device. The first sorting system is operatively connected to the first detection system and configured to direct a droplet into a side channel of the microfluidic device if the detection system fails to detect the presence of chlorophyll in the droplet.

Instead of or in addition to the first detection and sorting systems, the system may comprise a second detection system and a second sorting system downstream of the droplet generator, wherein the second detection system is configured to detect the presence of a desired characteristic in a droplet flowing in the microfluidic device. The second sorting system is operatively connected to the second detection system and configured to direct a droplet into a side channel of the microfluidic device if the second detection system does not detect the presence of the desired characteristic in the droplet.

In embodiments, the system further comprises a collection system to collect droplets exiting the microfluidic device. The system may optionally also comprise an automated dispenser that is configured to deposit single droplets onto a culture support.

In another aspect, the invention relates to methods for propagating plant material. The methods comprise providing a solution that comprises a plurality of plant protoplasts comprising an encapsulation medium or encapsulation medium precursor, introducing the solution in a microfluidic chip, forming droplets of the solution in the microfluidic chip, at least some of which encapsulate a single protoplast, causing the encapsulation medium or encapsulation medium precursor to gelify in the microfluidic chip, and collecting the encapsulated protoplasts.

Advantageously, this method may achieve improvements in the viability of the resulting protoplasts and as a result increase the efficiency of recovery of whole plants from these protoplasts.

In preferred embodiments, the method further comprises detecting the presence of a protoplast in a droplet flowing in the microfluidic device and directing droplets that do not contain a protoplast in a separate channel from droplets that contain a protoplast. In some embodiments, detecting the presence of a protoplast in a droplet comprises detecting a fluorescent signal associated with chlorophyll. Advantageously, this enables to recover and culture only those droplets that have the potential to regenerate plants, thereby increasing the efficiency of the plant recovery process and reducing the material and resources used to maintain the droplets in culture.

In embodiments, the process of forming droplets of the solution in the microfluidic device comprises introducing the first solution comprising the plurality of protoplasts via a main channel and introducing a second solution via two side channels that intersect and thereby communicate with the main channel within an encapsulation zone, the second solution being immiscible with the first solution comprising the protoplasts. Advantageously, this may generate a flow of droplets with consistently predictable sizes and volumes by adjusting the fluid pressure in the main and side channels and adjusting the diameters of the main and fluid channels, wherein the size of the droplets can be chosen in line with the size of the protoplasts. Further, the inventors have found this configuration to function well to generate droplets of an appropriate size for plant protoplasts with a relatively slow flow, which is gentle on the cells and hence further improves the recovery efficiency of the method. Preferably, the main channel has a diameter of not less than about 50 and not more than 150 μm, not less than about 80 and not more than about 120 μm, or optionally about 100 μm. The side channels may have a diameter of not less than about 50 and not more than about 300 μm, not less than about 100 and not more than about 300 μm, not less than about 150 and not more than about 250 μm, or optionally about 200 μm. In embodiments, the main channel comprises constricting sections immediately preceding and following the encapsulation zone, where the main channel is narrower in calibre than in the sections that immediately precede or follow. The narrower sections may have a diameter of about 60 μm.

In embodiments, the encapsulation medium precursor or encapsulation medium is selected from the group consisting of: sodium alginate; agar; agarose; agar substitute (such as Phytagel™); and gellan.

In embodiments, the solution comprises an encapsulation medium precursor and causing the encapsulation medium precursor to gelify in the microfluidic device comprises contacting the droplets of solution in the microfluidic device with a compound that directly or indirectly triggers gelification of the encapsulation medium precursor, thereby forming a gelified encapsulation medium.

In some embodiments, the encapsulation medium precursor is sodium alginate. In embodiments, the solution further comprises $Ca^{2+}$ ions, wherein the $Ca^{2+}$ ions are segregated from the solution in a releasable manner. This allows triggering of the gelation of the alginate in a controllable manner. Further, sodium alginate is commonly available and compatible with many plant propagation conditions and media. In embodiments, the $Ca^{2+}$ ions are chelated. In such embodiments, the compound that triggers gelification may be an acid. Advantageously, the acid may be chosen to be non-toxic in the concentrations required to trigger the release of $Ca^{2+}$ ions. For example, acetic acid may be advantageously used as it is not toxic to plant cells at the required concentrations, and is also not toxic to human operators.

In embodiments, contacting the droplets of solution in the microfluidic chip with a compound that directly or indirectly triggers gelification of the encapsulation medium precursor comprises including the compound in a second liquid that is immiscible with the first liquid and that is used to create the droplets in the microfluidic chip. Advantageously, this may enable the controlled gelification of the droplets shortly after or at the point where they are formed.

In some such embodiments, an acid may be provided in the second liquid. The inventors have found that it is advantageously possible to provide acids in a hydrophobic solution which is suitable for use as a second liquid, in such a manner that the acid can diffuse into the droplets and trigger the gelification of the encapsulation medium precursor. Preferably, the acid is present in the second liquid at a concentration of between about 0.3% by volume and about 2% by volume, between about 0.5% by volume and about 1% by volume, between about 0.35% by volume and about 0.5% by volume, or about 0.35% by volume. The inventors have found that such concentrations of acid in oil were sufficient to trigger the gelling of alginate present in droplets of a solution comprising protoplasts, while not lowering the pH of said solution excessively, thereby also avoiding or reducing damage to the cells in the droplets. Advantageously, the acid may be present in the second liquid at a concentration such that the pH in the droplets is decreased to not less than about 5.5, suitably not more than about 5.9, typically about 5.7.

In alternative embodiments, the solution comprises an encapsulation medium and causing the encapsulation medium to gelify in the microfluidic chip comprises applying conditions that trigger the gelification of the encapsulation medium downstream of the droplet generator. In some such embodiments, the conditions that trigger the gelification include a decrease in temperature. Such embodiments may advantageously avoid the need for providing further compounds that trigger gelification and/or controlling the presence of such compounds.

In advantageous embodiments, the solution of plant protoplast comprises growth promoting agents. Use of one or more compounds selected from the group consisting of: a salt; a vitamin; a carbohydrate; an auxins; a cytokinin; a hormone; a phytosulfokine; and an oligopeptide is particularly advantageous. Growth promoting agents may advantageously initiate and/or promote plant recovery from the encapsulated protoplasts.

In some embodiments, the method further comprises detecting the presence of a desired characteristic associated with the protoplasts flowing through the microfluidic device, and directing droplets containing a protoplast that does not have the desired characteristic in a separate channel from droplets containing a protoplast that does have the desired characteristic. Beneficially, such embodiments may for example be implemented by means of a detecting system, e.g. an optical detection system, combined with a cell sorter, for example a dielectric focuser.

In embodiments, detecting the presence of a desired characteristic comprises detecting a fluorescent signal associated with a fluorescent protein or molecule.

In embodiments, detecting the presence of a desired characteristic comprises detecting the presence or absence of a signal indicative of an infection. In some embodiments, detecting the presence of a signal indicative of an infection comprises detecting a fluorescent or chemiluminescent signal associated with the presence of pathogen nucleic acid or pathogen protein. Advantageously, the methods of the invention can therefore be used to select healthy protoplasts and only regenerate plants from these cells. Propagation of disease-free plant material is notoriously difficult as the inclusion of even a single infected cell in a culture can negate all efforts made to sanitise the culture. The methods of the invention advantageously provide a solution to this problem which dramatically increases the recovery rates of healthy cells while reliably excluding any unhealthy cells.

Therefore, according to a further aspect, the invention provides a method of selecting and propagating disease-free plant material, the method comprising treating a solution of protoplasts with a disease marker, and applying the methods of the previous aspect to separate, select and propagate plant material.

Advantageously, the methods of the invention can instead or in addition be used to select protoplasts that have a desired characteristic, for example because this characteristic has been engineered into the plant. Engineering characteristics in plants is resource intensive at least in part because the engineering process typically has very low yield and a large amount of cells typically have to be grown back into plants in a resource and time intensive process before it is possible to assess whether any of those plants have been successfully modified. Because the methods of the invention enable the selection of protoplasts with a desired characteristic prior to regeneration of a plant, in a reliable manner and with highly efficient recovery of plants from protoplasts, it is possible to focus efforts and resources in culture exclusively on growing those plants that have the desired characteristic.

Therefore, according to a further aspect, the invention provides a method of engineering plant material with a desired phenotype or characteristic, the method comprising genetically modifying a population of protoplasts and applying the method described herein to separate, select and propagate plant material.

According to a further aspect, the invention relates to a plant cell obtained using the methods of the invention, and to a plant, or plantlet, obtained by regeneration of the plant cell. In embodiments, the plant cell is genetically engineered.

In some embodiments the plant is selected from one or more of *Solanum* spp., *Brassica* spp., *Capsicum* spp., *Lupinus* spp., *Phaseolus* spp., *Vigna* spp, *Vicia faba; Cicer arietinum, Pisum sativum, Lathyrus* spp., *Glycine max; Psophocarpus; Cajanus cajan; Arachis hypogaea; Lactuca* spp., *Asparagus officinalis; Apium graveolens; Allium* spp., *Beta vulgaris; Cichorium intybus; Taraxacum officinale, Eruca* spp., *Cucurbita* spp., *Spinacia oleracea; Nasturtium officinale; Cucumis* spp., *Olea europaea; Daucus carota; Ipomoea batatas; Ipomoea eriocarpa; Manihot esculenta; Zingiber officinale; Armoracia rusticana; Helianthus* spp., *Cannabis* spp., *Pastinaca sativa; Raphanus sativus; Curcuma longa; Dioscorea* spp., *Piper* spp., *Zea* spp., *Hordeum* spp., *Gossypium* spp., *Triticum* spp., *Vitis vinifera; Prunus* spp., *Malus domestica; Pyrus* spp., *Fragaria vesca* and *Fragaria x ananassa; Rubus idaeus; Saccharum officinarum; Sorghum saccharatum; Musa balbisiana* and *Musa x paradisiaca; Oryza sativa; Nicotiana tabacum; Arabidopsis thaliana; Citrus* spp., *Populus* spp.; *Tulipa gesneriana; Medicago sativa; Abies balsamea; Avena orientalis; Bromus mango; Calendula officinalis; Chrysanthemum balsamita; Dianthus caryophyllus; Eucalyptus* spp.; *Impatiens biflora; Linum usitatissimum; Lycopersicon esculentum; Mangifera indica; Nelumbo* spp.; *Poaceae* spp.; *Secale cereale; Tagetes erecta*; and *Tagetes minuta*.

The methods according to any aspect may comprise any of the embodiments of the systems and apparatuses for propagating plant material as described herein. Further, any of the features described in relation to methods described herein may be present in systems and apparatuses for plant propagation as described herein.

BRIEF DESCRIPTION OF THE DRAWINGS

One or more embodiments of the invention will now be described, by way of example only, with reference to the accompanying drawings, in which:

FIG. 3A, 3B, 3C are schematic representations of microfluidic devices for use in a particle deformation analysis system according to embodiments of the invention;

FIGS. 6A-D shows photos of protoplasts cultures after 5 days in culture, in comparative samples (non-encapsulated protoplasts—FIGS. 6A-D), samples obtained according to the invention (i.e. after microfluidic encapsulation—FIGS. 6C-D).

DETAILED DESCRIPTION OF THE INVENTION

Although the invention will be described by way of examples, it will be appreciated by a person skilled in the art that the invention could be modified to take many alternative forms without departing from the spirit and scope of the invention as defined in the appended claims.

All references cited herein are incorporated by reference in their entirety. Unless otherwise defined, all technical and scientific terms used herein have the same meaning as commonly understood by one of ordinary skill in the art to which this invention belongs.

According to the invention, there is provided a system comprising a microfluidic device, and methods that allows recovery of plant protoplasts and propagation into whole plants with high efficiency using the microfluidic device. Protoplasts introduced in the microfluidic device are guided through microfluidic channels that separate out the cell solution into single cells which are then encapsulated in a media which protects and provides nutrition to the protoplasts. As a result, the viability of the resulting protoplasts is greatly increased and so is the efficiency of recovery of whole plants from these protoplasts.

Figure 1:
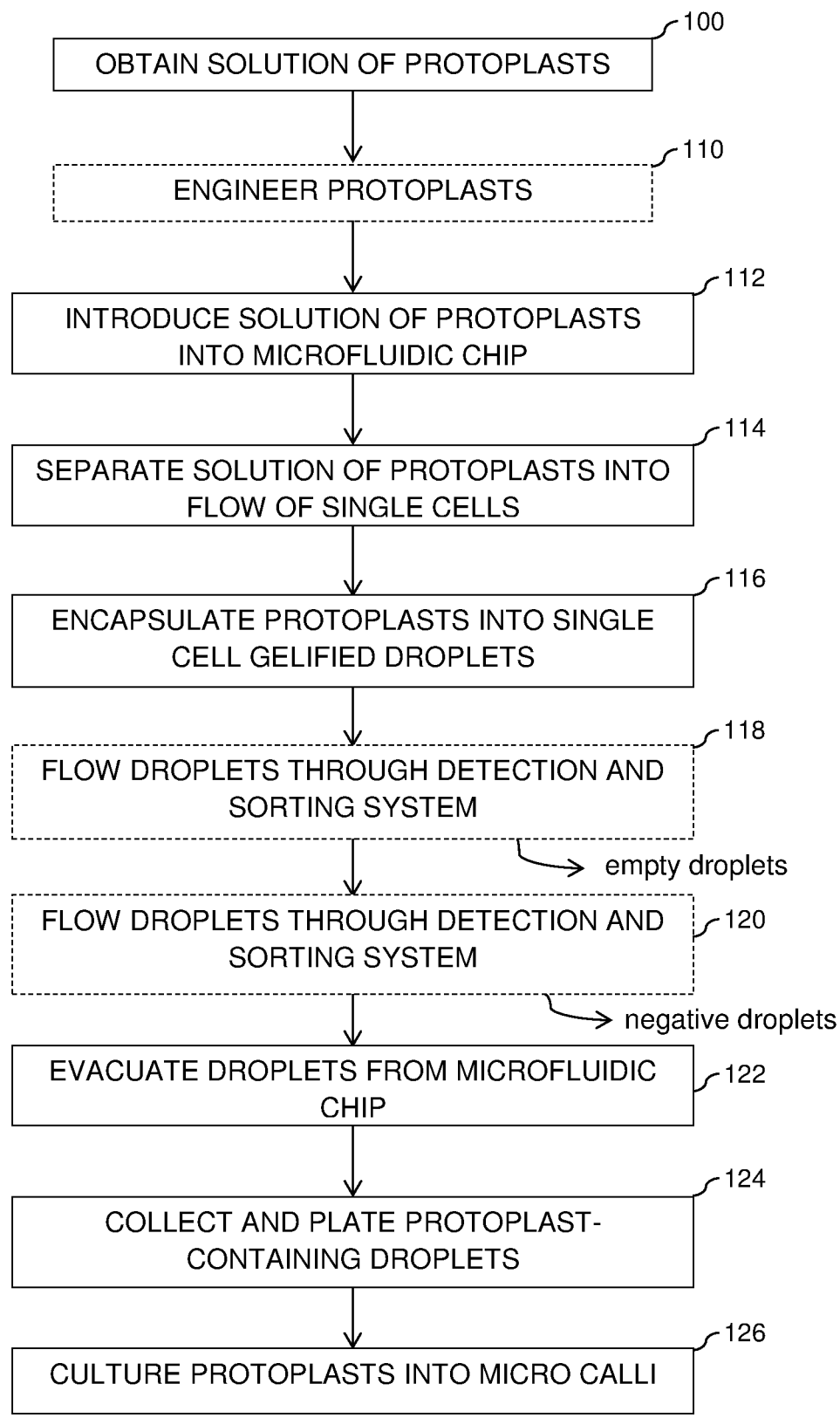
FIG. 1 is a flow diagram of a method of propagating and selecting plants according to embodiments of the invention.

FIG. 1 shows a flow diagram of a method of propagating and selecting plants according to embodiments of the invention. At step 100, a solution of protoplasts is obtained from a sample of plant tissue.

As used herein, the term "plant protoplasts" (also referred to simply as "protoplast", throughout this disclosure) refers to a plant cell that has had its cell wall completely or partially removed. Removal of cell wall can be effected by mechanical, chemical or enzymatic means. In embodiments, protoplasts are obtained from suitable plant material using cell wall digestive enzymes. For example, enzymes such as cellulase, macerozyme, pectinase, hemicellulase, pectolyase, driselase, xylanase and combinations thereof may be suitable for use in the context of the invention. In embodiments, cellulase may be used at a concentration of 1 w %-1.5 w %. In embodiments, macerozyme may be used at a concentration of 0.2 w %-0.4 w %. In embodiments, hemicellulase may be used at a concentration of 2 w %-5 w %. In embodiments, pectolyase may be used at a concentration 0.01 w %-0.5 w %. In embodiments, driselase may be used at a concentration of 0.5 w %-2 w %. Protocols for obtaining protoplasts from plant tissues are known in the art (see e.g. Sheen et al., 2007) and will not be discussed further here. In embodiments, suitable plant cell material may include root tissue, leaf mesophyll and/or cultured callus. In embodiments, the protoplasts are obtained using the protocol described in Yoo, Cho, & Sheen (2007), which is incorporated herein by reference.

At step 110, the protoplasts are optionally engineered to obtain a desired characteristic, as will be explained further below.

In embodiments, the (optionally engineered) protoplasts are washed one or more times before being re-suspended in a solution. For example, the protoplasts may be washed one or more times using a buffer. At step 112, a solution containing the protoplasts is introduced into a microfluidic device for particle separation, encapsulation with encapsulation medium, and optionally screening and selection. In embodiments, the solution in which the protoplasts are suspended is adapted to the species of plant that the protoplasts are derived from. In embodiments, plant media (for example Gamborg—B5 or Murashige Skooge) may be supplemented with one or more salts, vitamins and carbohydrates that may be specially adapted to the species used. In embodiments, the solution is adapted to stimulate protoplast regeneration. In embodiments, the solution is adapted to maintain the undifferentiated state of the cells by exposing the protoplasts to one or more auxins, cytokinins, hormones, phytosulfokines, oligopeptides or other components that support protoplast regeneration, or combinations thereof. Protocols for preparing solutions that support protoplast regeneration may be found for example in Eeckhaut et al., 2013. In embodiments, the solution comprises $Ca^{2+}$ ions. $Ca^{2+}$ ions are believed to be an important component to aid cell wall reformation, and as such its presence in the solution promotes protoplast regeneration and recovery. Additionally, as will be further explained below, $Ca^{2+}$ ions may play an important part in encapsulation of the protoplasts. In embodiments, substantially all $Ca^{2+}$ ions in the solution containing the protoplasts are chelated or otherwise segregated from the solution in a releasable manner. Chelating agents suitable for segregating $Ca^{2+}$ ions in a releasable manner in an aqueous solution are known in the art. In embodiments, the $Ca^{2+}$ ions are chelated by EDTA (ethylenediaminetetraacetic acid). In embodiments, the solution comprising the protoplasts comprises $Ca^{2+}$ ions and EDTA, and the concentration of EDTA in the solution is substantially equal to or higher than the concentration of $Ca^{2+}$ ions. In embodiments, the solution comprises at least 50 mM, at least 80 mM, at least 100 mM, at least 120 mM, at least 150 mM or at least 200 mM $Ca^{2+}$ ions. In embodiments, the solution comprises $Ca^{2+}$ ions as $CaCl_2$.

As used herein, the term "microfluidic" refers to the science and technology that relates to manipulation of fluids in networks of channels with lowest dimensions from tens to hundreds of micrometres, typically involving volumes in the pico to microliters range. As used herein, a device that comprises microfluidic channels may be referred to as a "microfluidic chip". A microfluidic chip is commonly a piece of material of dimensions between a few square millimetres to square centimetres size, in which channels of a desired configuration are created. Silicon, glass or plastic chips are commonly used substrates for microfluidics devices. Microfluidic chips may include channels with geometric features etched or engraved therein which are designed to mix multiple components, incubate or store liquids, separate components, or move fluid components.

At step 114, the solution of protoplasts is separated into a flow of single cells, in the microfluidic chip. For example, this can be achieved by regulating the concentration of the protoplast solution, the size of the channel and/or the flow rate of the solution in the microfluidic chip. At step 116, the protoplasts are encapsulated by forming droplets comprising the protoplasts and triggering the formation of a gel in at least an outer part of the droplets. In embodiments, the formation of droplets can be achieved by converging the flow of solution comprising the protoplasts in the microfluidic chip with a flow of a second liquid that is not miscible with the protoplast solution. In embodiments, the second liquid is a hydrophobic liquid. For example, the second liquid may comprise an oil, preferably an inert oil. For example, the second liquid may comprise a mineral oil.

As used herein, the term "encapsulation" relates to the process of forming a non-liquid medium (referred to herein as "encapsulation medium") such as a gel, around a protoplast, such as forming or enclosing a droplet in which the protoplast is protected. Encapsulation ensures that the protoplast is protected while flowing through and out of the system, by forming a layer of protecting medium around the cells that acts like an "artificial cell wall". As a result, the cell viability of the protoplasts is increased and the efficiency of whole plant recovery from these protoplasts is improved.

In embodiments, the solution in which the protoplasts are suspended comprises an encapsulation medium precursor and the encapsulation step comprises forming droplets and triggering gelification of at least some of the encapsulation medium precursor in the solution. Within the context of this disclosure, an encapsulation medium precursor is a compound that is capable of gelification under predetermined gelification conditions.

In embodiments, the encapsulation medium comprises calcium alginate and the encapsulation solution comprises sodium alginate as an encapsulation medium precursor. Sodium alginate is capable of gelification in the presence of $Ca^{2+}$ ions. When in contact with the $Ca^{2+}$ ions, the sodium alginate solution forms a calcium alginate gel which can form a protective "capsule" for a protoplast present in the protoplast solution.

In embodiments, the encapsulation step comprises contacting the solution comprising the protoplasts and the encapsulation medium precursor with a second solution that comprises a compound that directly or indirectly triggers the gelification of the encapsulation medium precursor. For example, the encapsulation medium precursor may comprise sodium alginate and the encapsulation step may comprise contacting the solution comprising the protoplasts and sodium alginate with a solution comprising $Ca^{2+}$ ions or an agent capable of causing the release of $Ca^{2+}$ ions present in the solution comprising the protoplasts and sodium alginate. For example, the solution comprising the protoplasts may comprise sodium alginate and $Ca^{2+}$ ions chelated with EDTA. In such examples, the solution can be contacted with a second liquid (also referred to herein as 'second solution') comprising an acid. For example, the second liquid may comprise acetic acid or any other acid that is preferably non-toxic to protoplasts at a concentration sufficient to cause release of $Ca^{2+}$ ions from EDTA chelates. In embodiments, the second liquid comprises acetic acid at a concentration of at least about 0.3% by volume. In embodiments, the second liquid comprises acetic acid at a concentration of at most about 2% by volume. In embodiments, the second liquid comprises acetic acid at a concentration of at least about 0.3% by volume and at most about 2% by volume, at least about 0.5% by volume and at most about 1% by volume, suitably between about 0.35% by volume and about 0.5% by volume, or about 0.35% by volume. In embodiments, the second liquid comprises an acid in an amount such that a 5 µl droplet of aqueous at pH neutral in the second solution is brought to a pH at least as low as would be obtained if the second solution contained 0.3% by volume of acetic acid, and preferably no lower than would be obtained if the second solution contained 2% by volume of acetic acid. In embodiments, the second liquid comprises an acid in an amount such that the droplets of the protoplast solution are brought to a pH of between about 5.5 and about 5.9, preferably about 5.7, due to the presence of the acid in the second liquid surrounding the droplets. As the skilled person would understand, the exact concentration of acid in the second liquid that results in this pH in the droplets may depend at least on the particular acid used. Further, as the skilled person would understand, the pH equivalent in the second liquid may be lower than the pH that is preferably achieved in the droplet. For example, the pH equivalent in the second liquid may be between at least about 4.5 and about 7, preferably between about 5 and 6, for example between 5 and 5.5.

In embodiments, the second solution has a pH equivalent to that of a solution comprising at least about 0.3% by volume of acetic acid in oil, between about 0.3% by volume and about 2% by volume, between about 0.5% by volume and about 1% by volume, between about 0.35% by volume and about 0.5% by volume, or about 0.35% by volume of acetic acid in oil. It will be appreciated that pH may be adjusted by addition of one or more H+ donors (e.g. protic solvents) or a Lewis acid, for example. In embodiments, the second solution comprises an emulsifier. In embodiments, the second solution comprises an emulsifier at a concentration of between about 2% vol and about 10% vol, between about 2% vol and about 5% vol, or about 4% vol. In embodiments, the emulsifier is polysorbate 80 (also known as Span 80). The emulsifier may help to disperse the acid in the second solution, particular when the second solution is hydrophobic.

In embodiments, the second solution comprises a compound that directly triggers gelification of the encapsulation medium precursor. For example, the second solution may comprise an acid, and the acid may directly trigger gelification of an encapsulation medium precursor in the first solution, where gelification of the encapsulation medium precursor can be triggered by H+ ions. Such embodiments may for example use gellan gum as an encapsulation medium precursor.

In embodiments, the encapsulation medium precursor is sodium alginate, and the sodium alginate is provided in the solution comprising the protoplasts at a concentration of 0.01 to 10% by weight, 0.01 to 5% by weight, 0.1 to 5% by weight, 0.5 to 5% by weight, 0.1 to 2% by weight, 0.5 to 2% by weight, or 0.5 to 1.5% by weight.

In embodiments, the encapsulation medium comprises other compounds capable of gelification, for example based on cooling. For example, the encapsulation medium may comprise low melt (EEO) agarose, low melt (EEO) agar, phytagel, and/or gellan (e.g. Gelrite®). In embodiments, low melt (EEO) agarose may be present at a concentration of 0.01-5% by weight. In embodiments, low melt (EEO) agar may be present at a concentration of 0.01-5% by weight. In embodiments, phytagel may be present at a concentration of 0.01-2% by weight. In embodiments, gellan may be present at a concentration of 0.01-0.2% by weight. In embodiments, the encapsulation step 116 comprises forming droplets comprising the protoplasts and triggering the formation of a gel in at least an outer part of the droplets by cooling down the flow of droplets. As such, the systems of the invention may comprise means to cool down the flow of droplets.

In embodiments, the solution comprising the encapsulation medium or the encapsulation medium precursor comprises growth promoting agents, as will be explained further below. This further increases the cell viability of the encapsulated protoplasts and results in higher whole plant recovery yields. In embodiments, the choice of the particular gelling agent and the composition of the encapsulation medium may be dependent on the species of plant from which the protoplasts are derived and/or the composition of the solution (e.g. growth promoting solution) in which the protoplasts are suspended.

As the skilled person would understand, the encapsulation step aims to create droplets each enclosing a single protoplast, where the droplet is gelified or comprises a gelified outer layer. However, in practice droplets that comprise more than one (such as e.g. two) or no protoplast (empty droplets') may be formed, depending on the concentration of protoplasts in the protoplast solution and the flow rates used in the microfluidic chip.

Preferably, the concentration of protoplasts and the flow rates are chosen such that empty droplets are more likely than droplets comprising more than one protoplast.

At step 118, the droplets comprising the encapsulation medium are optionally directed through a first detection and sorting system. The first detection and sorting system is configured to detect the presence of a protoplast in each droplet. For example, the presence of a fluorescence signal associated with chlorophyll may be used for this purpose, as will be explained further below. The detection and sorting system directs any empty droplet (i.e. droplets that do not contain a protoplast) to a different channel from droplets that are determined to contain a protoplast, where the former may for example be directed to a waste collection system. In embodiments, the detection and sorting system is omitted and all droplets (including empty droplets) are evacuated 122 from the microfluidic chip.

At step 120, the droplets are optionally flowed through a further detection and sorting system. The further detection and sorting system is configured to detect the presence of a desired characteristic in the protoplast encapsulated in each droplet. For example, the presence of a fluorescence signal may be detected which is associated with a fluorescent protein, the coding sequence of which has been introduced or activated in the protoplast by the manipulation at step 110. The further detection and sorting system may direct any negative droplet (i.e. droplets that do not have a desired characteristic) to a different channel from positive droplets, where the former may for example be directed to a waste collection system. As the skilled person would understand, the nature of the further detection and sorting system may vary depending on the characteristic to be tested, as well as whether a modification of the protoplasts was made at step 110. In embodiments, the second detection and sorting system may be omitted. In embodiments, multiple characteristics may be detected by one or more further detection and sorting systems. In such embodiments, droplets may be considered to be negative and routed to the waste collection system if any, a predetermined subset, or all of the characteristics are absent. The first and further detection and sorting systems may each be present or absent. In embodiments, the first and further detection and sorting systems may be combined into a single system that detects both the presence of a protoplast and the desired characteristic, and directs any negative or empty droplet in a different channel from any positive (and hence non-empty) droplet.

At step 122, the (optionally selected) droplets are evacuated from the microfluidic chip through an outlet.

At step 124, the droplets are collected and plated on cell culture plates, as will be explained further below. At step 126, the encapsulated protoplasts are cultured to generate micro calli. These micro calli can then be used to regenerate whole plantlets.

Figure 2:
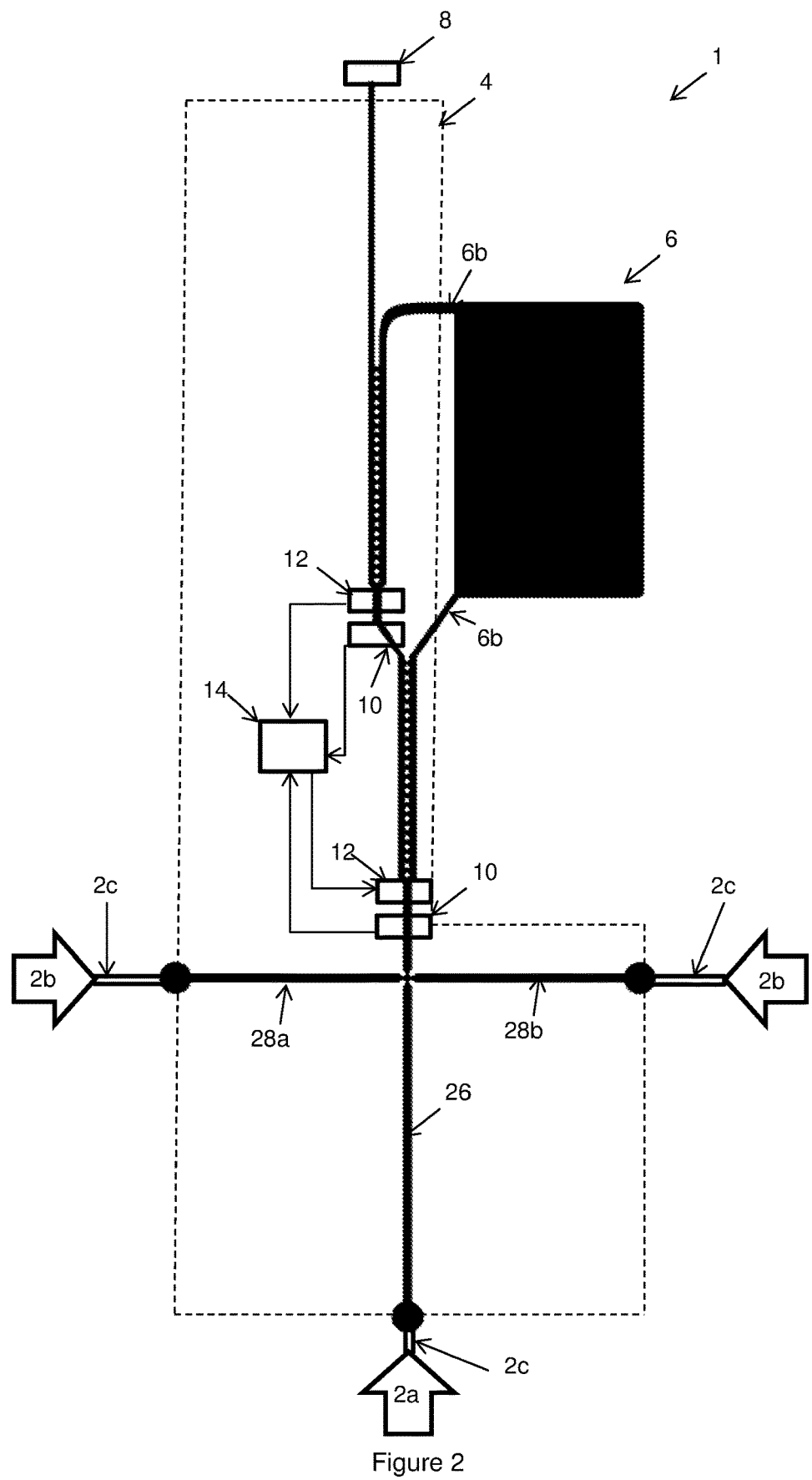
FIG. 2 is a schematic representation of a plant propagation and selection system according to embodiments of the invention.

FIG. 2 is a schematic representation of a general system according to embodiments of the invention. The system 1 comprises a liquid injection system 2, a microfluidic chip 4, a waste collection system 6, and a protoplast collection system 8. The collection system 8 may comprise a mechanism to collect the encapsulated protoplasts flowing out of the microfluidic chip 4. In embodiments, the encapsulated protoplasts collected in the collection system 8 may be manually dispensed on a cell culture system of choice. In embodiments, the encapsulated protoplasts collected in the collection system 8 may be automatically dispensed. For example, 'inkjet printer' type distribution systems may be used to dispense the encapsulated protoplasts on a cell culture system of choice. In embodiments, the encapsulated protoplasts may be dispensed manually or automatically on one or more microwell culture plates. Advantageously, individual encapsulated protoplasts may be dispensed in each microwell. Other types of culture plates may be used, as appropriate. In embodiments, encapsulated protoplasts may be secured in wells of culture plates with a gelling agent containing medium (e.g. agar plates). In embodiments, the plant growth culture medium may be provided in the culture plates.

The illustrated system additionally comprises a detection system 10, and a sorting system 12. For example, the detection system 10 may comprise a laser diode, and a fluorescence detection system such as a fluorescence microscope or a photodetector. Data from the detection system is transferred to a computing device 14, for example a computer. The computing device 14 comprises a processor, a memory and an interface. The computing device 14 is configured to use the data from the detection system 10 to identify protoplasts flowing through the microfluidic chip that have a characteristic of interest, and optionally to provide this data to a user via the interface. The computing device 14 can process the data from the detection system 10 in order to produce a control signal to the sorting system 12, preferably in near real-time. The sorting system 12 comprises a mechanism to direct protoplasts flowing through the microfluidic chip 4 in a select one of two or more branches provided in the microfluidic chip 4. In embodiments, the sorting system 12 comprises a pressure valve or a pair of electrodes which are able to generate a dielectrophoretic force. As explained above, multiple such detection 10 and sorting 12 systems may be provided in series, to select for different characteristics. For example, a first detection system 10 and sorting system 12 may select droplets that are not empty, and a second detection system 10 and sorting system 12 may select droplets that are positive for a characteristic of interest. The detection system(s), sorting system(s) and microfluidic chip will be described in more detail in the relevant sections below.

The liquid injection system 2 typically comprises at least two syringes 2a, 2b and tubing 2c that connects the syringes to inlets on the microfluidic chip 4. In particular, the liquid injection system 2 comprises a first syringe 2a that is configured to inject a first liquid, which is a protoplast solution, into an inlet of the microfluidic chip, and at list a second syringe 2b (or two separate syringes 2b, as in the depicted embodiment) that is configured to inject a second liquid into two additional inlets of the microfluidic chip. The second liquid can comprise a medium that is immiscible with the first liquid, to form droplets of the first liquid, as explained above. The liquid injection system 2 advantageously comprises a pumping mechanism that allows an operator to control the flow of liquid into the microfluidic chip 4. As the person skilled in the art would understand, any injection system known in the art that is suitable for use with a microfluidic chip may be used in the system of the invention. Preferably, the injection system comprises a syringe pump that is configured to provide undisrupted flow. Preferably, disposable sterile plastic equipment, or reusable sterilisable equipment is used to ensure that the injection system does not introduce any contamination in the system. For example a neMESYS syringe pump (Cetoni), 2 ml Plastipak Syringes (BD) and/or ⅟₁₆ inches PTFE tubing (Sigma-Aldrich®) or other autoclavable plastic tubing, or similar pulseless syringe equipment, may be used. Similarly, the waste collection system 6 typically comprises one or more containers 6a and tubing 6b that connects one or more outlets on the microfluidic chip to the one or more containers 6a. The details of the collection system are not essential to the invention and will not be described in further detail here.

Figure 3A:
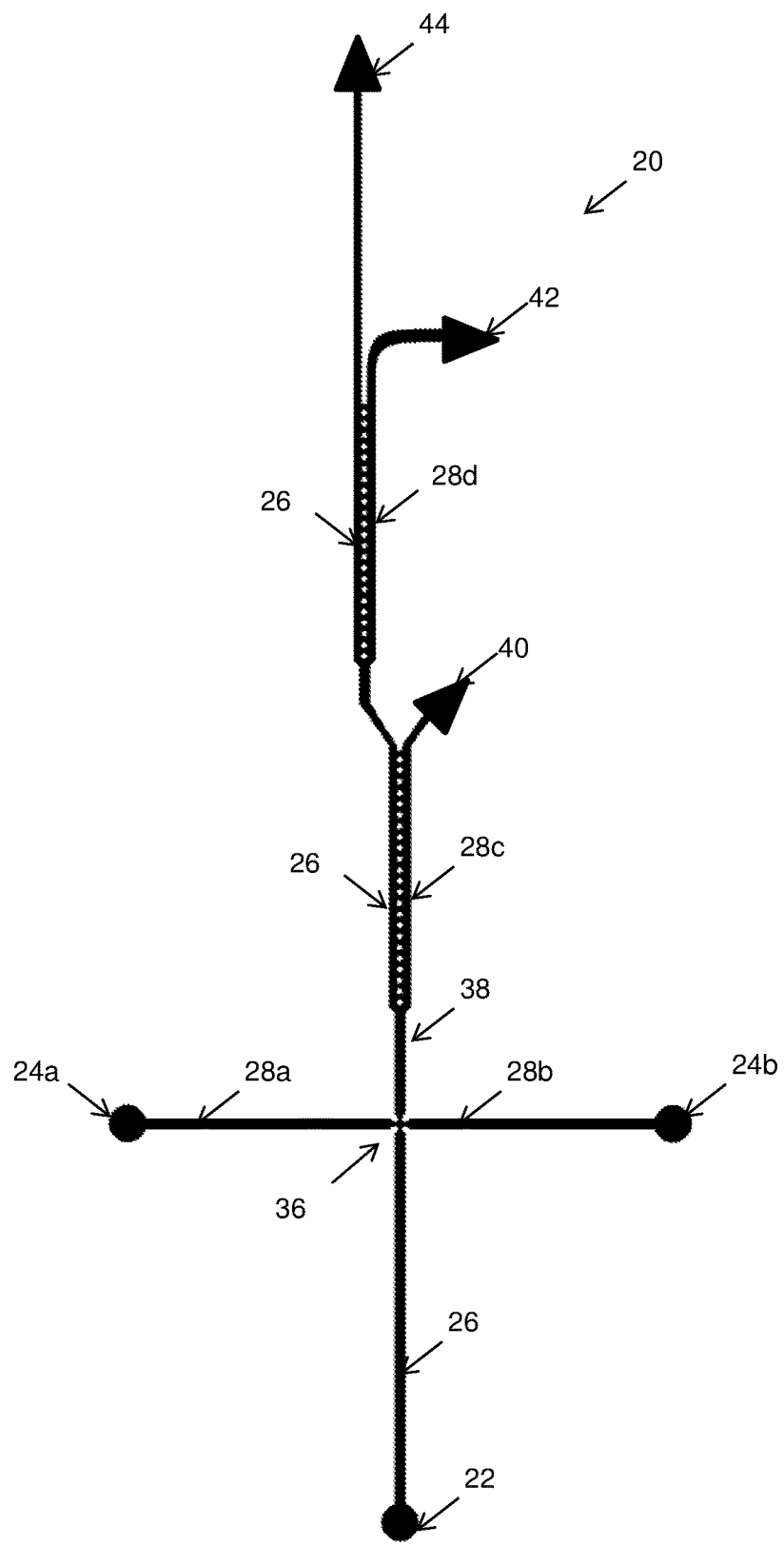

As shown in FIGS. 3A-C (discussed in more detail below) the microfluidic chip 4 includes a main channel 26 through which protoplasts are carried by a flow of fluid or liquid (first liquid), and two side channels 28a, 28b through which respective flows of a second liquid that is immiscible with the first liquid are made to converge with the flow in the main channel 26. At the point of confluence between the main channel 26 and the side channels 28a, 28b, droplets are formed comprising single protoplasts and an encapsulation medium or encapsulation medium precursor. In embodiments, gelification of the encapsulation medium or encapsulation medium precursor is also triggered at the point of confluence, forming single droplets comprising gelified encapsulation medium. In embodiments, gelification is directly or indirectly triggered by a component present in the second liquid. In embodiments, gelification is triggered after droplet formation, for example by applying a condition that promotes gelification, such as by cooling the droplets.

In embodiments, each droplet contains on average a single cell. For example, the liquid injection system 2 may be configured such that the protoplast solution is injected into the microfluidic chip 4 at a pressure slightly lower than that at which the encapsulation medium is injected into the microfluidic chip. This advantageously results in the majority of droplets of encapsulation medium formed at the intersection of the main 26 and side channels 28a, 28b comprising one or no cell.

According to embodiments of the invention, there is provided a microfluidic chip and a system for propagating plant material comprising the microfluidic chip.

FIGS. 3A, 3B and 3C show schematically microfluidic chips 20 according to embodiments of the invention. The microfluidic chip 20 comprises a first or main flow inlet 22, and in the embodiments of FIGS. 3A and 3B, a pair of second liquid flow inlets 24a, 24b. The first inlet 22 is used to introduce a flow of protoplasts into the main channel 26 of the microfluidic chip 20. The inlets 24a, 24b are used to introduce a second flow of liquid into the side channels 28a and 28b of the microfluidic chip in order to form droplets comprising protoplast and an encapsulation medium or encapsulation medium precursor. In alternative embodiments, as shown on FIG. 3C, a single inlet 24 may be provided to feed into both channels 28a and 28b.

In embodiments, as shown on FIGS. 3B and 3C, the microfluidic chip 20 comprises one or more inertial focusers 44. For example, an inertial focuser may comprise alternating bends with different radii of curvature and widths. Other focusing principles may be used, such as those described in Xuan et al. 2010. This fluidic element has two main effects: it focuses scattered cells down to a single stream, centred in the middle of the channel downstream of the inertial focuser; and it introduces even spacing between consecutive cells along the stream. In inertial focusers, the focusing effect is the result of an appropriate ratio between the secondary Dean flow and inertial lift that, in turn, depend on the channel dimensions, aspect ratio, radius of curvature, particle diameter, and flow rate (see e.g. Amini et al., 2014). The longitudinal spacing depends on the suspension concentration, the channel Reynolds number $Re_c$, and the particle Reynolds number $Re_p$. Microfluidic elements capable of focusing particles into a single stream may be utilised (see e.g. Di Carlo et al., 2007; Kahkeshani et al., 2016). After any selection event within the microfluidic chip, the main channel splits into two, inertial focusing favours one of the two arms. Cells unless physically moved will always continue down the favoured arm. Microstructures capable of this may be utilised (see e.g. Chung et al., 2013).

The two side channels 28a, 28b intersect the main channel 26 at an encapsulation zone 36. Advantageously, the side channels 28a, 28b are arranged substantially symmetrically around the main channel 26 in the encapsulation zone 36. Preferably, the side channels 28a, 28b are substantially perpendicular to the main channel 26 in the encapsulation zone 36 such that they intersect the main channel 26 at opposing sides. The side channels, main channel and encapsulation zone cooperate to form a microfluidic droplet generator.

Advantageously, because the encapsulation flow(s) and the main flow are introduced into the chip via separate inlets, the flows can be independently controlled by separate injection systems 2.

After passing through the encapsulation zone 36, the combined flow continues to travel through the main channel 26 and, in the embodiment depicted on FIG. 3A, travels through a first detection zone 38. In the first detection zone 38, the droplets formed in the encapsulation zone 36 are exposed to light in the absorption wavelength of chlorophyll, and the presence or absence of emission in the emission wavelength of chlorophyll is detected.

After the detection zone 38, the microfluidic chip 20 shown on FIG. 3A comprises a further side channel 28c, which is associated with a sorting system. The sorting system is able to direct droplets out of the main channel 26 and into the side channel 28c. The side channel 28c may communicate with a waste collection system via an outlet 40.

In the embodiment depicted on FIG. 3C, the microfluidic chip comprises a second detection zone 38'. In the second detection section zone 38', the droplets in the main channel 26 are assessed for the presence or absence of a characteristic of interest. For example, the droplets may be exposed to light in the absorption wavelength of a fluorescent protein that has been introduced or activated in the cell, and the presence or absence of emission in the emission wavelength of said protein may be detected.

After the second detection zone 38', the microfluidic chip 20 depicted on FIG. 3A comprises a further side channel 28d, which is associated with a sorting system. The sorting system is able to direct droplets out of the main channel 26 and into the side channel 28d. The side channel 28c may communicate with a waste collection system via an outlet 42.

Finally, droplets in the main channel are evacuated through an outlet 44.

In some embodiments of the invention, the main 26 and side channels 28 have substantially equal cross sections. In other embodiments, the main 26 and side channels 28 have different cross sections. In embodiments, side channels 28a, 28b have substantially equal cross sections. In embodiments, side channels 28c, 28d have a different cross section from that of the main channel 26 in the corresponding region of the main channel (i.e. at the point where the flow separates into the main channel 26 and side channel 28c or 28d). In embodiments, the main channel 26 has a constant cross section. In embodiments, the main channel 26 comprises multiple sections and each section may have a different cross section from that which precedes or follows it. These dimensions are dictated by the average size of the particles to be analysed, as well as other requirements that may be present for example for cell sorting (see below). Beneficially, the size of the channels may be selected to exceed those dimensions of the particles by at least 50% to avoid potential mechanical contacts with the walls of the channels. In embodiments, some or all of the channels have a substantially rectangular cross section. Some or all channels may have an elliptical or circular cross section. In embodiments, the diameter/width W of the main and/or side channels may be between at least 40 and at most 300 µm. The terms width and diameter of a channel are used interchangeably in this description to refer to the dimension that would be called diameter in a channel of circular cross section and width in a channel of rectangular cross section. In embodiments, the main channel 26 has a width of between about 50 and about 150 µm, between about 80 and about 120 µm, or about 100 µm. In embodiments, the side channels 28A, 28B have a width of between about 50 and about 300 µm, between about 100 and about 300 µm, between about 150 and about 250 µm, or about 200 µm. In embodiments, as illustrated on FIG. 3B, the main channel 26 comprises sections 262, 264 immediately preceding and following the encapsulation zone 36, where the main channel is narrower than in the sections 260, 266 that immediately precede (section 260) or follow (section 266). For example, sections 260 and 266 may have a diameter of about 100 µm, and sections 262, 264 may have a diameter of about 60 µm.

As previously explained, in the encapsulation zone 38, droplets are formed by the convergence of a flow of a first liquid and a flow of a second liquid, the second liquid being immiscible with the first liquid. In the embodiments shown on FIGS. 2 and 3, the convergence of the flows of first and second liquids is obtained using a cross configuration involving a first or main channel conveying the first liquid and two side channels conveying the second liquid. This configuration is also referred to as a flow focusing system, where the flow of the first liquid is 'squeezed' between two streams of the second liquid, thereby generating droplets. The inventors have found this configuration to be preferable to other droplet generator configurations as it enabled the use of relatively slow flows while generating droplets of appropriate size (where the fluid pressure and channel width both contribute to determining the droplet size). Relatively slow flows of droplets may be advantageous as they are comparatively gentle to the cells and are more easily monitored for e.g. quality control and cell sorting purposes. Within the context of this disclosure, a flow may be referred to as "slow" if it is below about 200 µl/hour. As the skilled person would understand, other configurations are possible. In particular, any configuration considered suitable for generating droplets in a microfluidic chip may be used within the context if the invention. For example, the first and second liquids may be injected in two orthogonal channels, where the channel conveying the first liquid joins with a single channel conveying the second liquid, creating droplets of the first liquid that thereafter travel in the channel conveying the second liquid.

According to embodiments of the invention, the protoplasts are encapsulated in a medium which comprises growth promoting agents. This increases the survival rates of the protoplasts generated according to the invention, and as a consequences increases the efficiency of recovery of full plants using the methods and apparatus of the invention.

According to embodiments of the invention, microcapsules flowing in the microfluidic chip may be selected based on the presence of a fluorescent signal associated with chlorophyll. This enables the selection of microcapsules which contain a live protoplast, thereby increasing the efficiency of recovery of full plants using the methods and systems of the invention.

In embodiments, the systems of the invention comprise a fluorescence detection system configured to detect the presence of a fluorescent signal associated with chlorophyll. For example, the detection system may be configured to provide light (excitation light) at an absorption wavelength of chlorophyll and to detect the emission of light at an emission wavelength of chlorophyll. For example, the detection system may comprise a light source emitting light between 405 to 544 nm, and a detector to detect the emission of light above 495 nm, such as between 600 and 800 nm. In embodiments, the excitation light is provided by a laser diode. In embodiments, the emission light is detected by a fluorescence microscope.

In embodiments, the systems of the invention can comprise a mechanism to detect and optionally to select encapsulated protoplasts based on one or more desired characteristic. Because the systems and devices of the invention comprise a microfluidic chip where each encapsulated protoplast in turn flows through the main channel, in theory, any information that can be obtained from a cell flowing in a microfluidic channel can additionally be obtained. In embodiments, the systems of the invention comprise an optical detection system, such as a fluorescence detection system. In combination with a sorting mechanism, this enables selection of protoplasts having a fluorescent marker indicative of a characteristic of interest. In embodiments, the methods of the invention comprise introducing the coding sequence for a fluorescent protein into a protoplast culture. In such embodiments, the methods of the invention may comprise using a fluorescence detection system to detect the expression of a fluorescent protein in the encapsulated protoplasts flowing through the microfluidic device.

In embodiments, a fluorescence detection system may be configured to detect both a signal indicative of the presence of chlorophyll and a signal indicative of the presence of a fluorescent marker indicative of a characteristic of interest.

In such embodiments, the detection system may be coupled to a sorting mechanism, and the system may be configured such that the sorting mechanism separates microcapsules between two different channels based on the combined presence of a signal indicative of the presence of chlorophyll and a signal indicative of the presence of a fluorescent marker.

In embodiments, a chemiluminescence detection system may be added to the system. In combination with a sorting mechanism, this enables selection of protoplasts having a chemiluminescent marker indicative of a characteristic of interest. In embodiments, the methods of the invention comprise introducing the coding sequence for one or more chemiluminescent proteins (e.g. luciferin, aequorin, etc.) into a protoplast culture. In such embodiments, the methods of the invention may comprise using a luminescence detection system to detect the expression of a chemiluminescent protein in the encapsulated protoplasts flowing through the microfluidic device.

In some embodiments, alone or in combination with any other embodiment, systems to measure other properties of cells may be added to the system. For example, imaging systems that measure the size and/or morphology of the protoplasts may be added to the system. For example, imaging/optical systems may be used to provide an indication of whether encapsulation was successful (i.e. whether a protoplast is present in the droplet). Further, systems that assess the size and/or morphology of the protoplasts prior to or post encapsulation may be used to provide an indication of the viability of the protoplasts. In such systems, it may be possible to select protoplasts that are more likely to recover successfully.

According to embodiments of the invention, the microfluidic chip comprises one or more sorting mechanisms which are operationally connected with one or more of the detection mechanisms mentioned above. In embodiments, as explained above, the sorting mechanism(s) are connected with the detection mechanism(s) via a computing device.

In embodiments, the microfluidic chip comprises one or more further side branches which separates from the main flow channel, and the system comprises a pair of electrodes which are configured to direct the encapsulated protoplast to either the main branch or the side branch by dielectrophoresis (DEP), depending on a signal received from a detection mechanism. Advantageously, DEP offers a way of sorting individual encapsulated protoplasts without the need to change the speed or directionality of flow generated by the syringe pump.

In embodiments, optical dielectrophoresis (ODEP) may be used instead of DEP, for example in situations where it is preferable to avoid using an electric field. Advantageously, ODEP allows to achieve a similar effect to optical tweezers while exposing the protoplasts to less powerful light, thereby reducing the risk of bleaching of the fluorophores or damaging the protoplasts themselves.

In embodiments, magnetic sorting may be used. in embodiments, other systems and devices for changing the position of microparticles and/or influence their entry into one of multiple branches of a microfluidic system are known in the art and will not be described further (see e.g. Gi-Hun Lee et al., 2016; Tzu-Keng Chiu., 2016).

After encapsulation and sorting of droplets containing encapsulated protoplasts, as explained above single encapsulated protoplasts may be manually or automatically placed into a tissue culture system, for example on an agar gel plate containing plant growth media or into a micro well plate containing gel and liquid with plant growth promoting media.

In embodiments, a callus inducing media may be used. For example, media such as Gamborg B5, Murashige Skoog or others may be used. As explained above, salts, vitamins and auxins, cytokinins and/or other hormones promoting growth of the single protoplast into a callus may be included in the medium, or the tissue culture plate.

In embodiments, calli having achieved a predetermined size may be moved into plant growth media with different auxins and cytokinins ratio to induce shoot formation. In embodiments, calli having undergone shoot formation may be moved to yet another plant growth medium to induce root formation. Preferably, any manipulation of the calli may be done under sterile conditions.

Small plantlets resulting from the above process may then be used in conventional micro propagation techniques.

According to embodiments of the invention, novel methods and apparatus are provided for efficiently engineering and recovering plants having a characteristic of interest. The combination of single cell rapid phenotyping and high efficiency of recovery of whole plants that are afforded by the invention are particularly advantageous in the context of plant engineering.

In particular, the invention can be used to screen plant protoplasts after they have been subjected to gene editing treatment with CRISPR/Cas9, other nucleic acid guided nucleases or any other nucleases such as TALENs or ZFNs. In embodiments, the invention can be used to screen plant protoplast after they have been subjected to gene editing treatment as described in WO2017061805A1, which is incorporated herein by reference.

In embodiments, on the method comprises delivering a Ribonucleoprotein (RNP) or other nuclease protein into individual protoplast using PEG transformation or other cell membrane penetration technique (see e.g. Woo et al., 2015).

In embodiments, the nuclease may be tagged with a fluorescent molecule such as GFP, RFP or a non-protein based fluorescence marker or a chemiluminescence marker such as luciferin. Advantageously, the marker can be used to ensure that the nuclease was successfully delivered to the cell. As a consequence, it is possible for the system to select protoplasts (e.g. by sorting in the microfluidic chip, as explained above, for example in combination with or in a subsequent step from sorting depending on the presence/absence of a protoplast in a droplet) containing a gene editing agent, thereby significantly increasing the efficiency of the gene editing process.

As the skilled person would understand, the methods of the invention re not limited to sorting cells with fluorescence or chemiluminescence signal generating molecule attached to nucleases, but to any fluorescence or chemiluminescence signal present in a protoplast, such as fluorescent or chemiluminescent protein derived from successful plasmid transformation of protoplasts.

In embodiments, the systems of the invention may be used to sort protoplasts depending on the presence or absence of a plasmid of interest (e.g. selecting protoplasts have undergone a successful plasmid transformation), wherein the plasmid transformation may be intended for gene editing, or any other purpose.

In embodiments, the systems and methods of the invention may be used to select protoplasts that were made by cell wall degradation of transgenic plants that express transgenes with e.g. fluorescent or chemiluminescent proteins as a signal of gene expression.

In embodiments, the systems and methods of the invention may be used to select protoplasts that were made by cell wall degradation of transgenic plants that express transgenes with e.g. fluorescent or chemiluminescent proteins that are indicative of cell type.

In embodiments, the systems and methods of the invention may be used to select protoplasts that were transformed using any method of transformation known in the art (e.g. PEG, plasmid, etc.) with any fluorescently tagged molecules such as proteins (e.g. antibodies, transcription factors, etc.) or other molecules that are able to interact with any internal component of a plant cell.

According to embodiments of the invention, there is provided a diagnostic assay comprising the systems for propagating and selecting plant material according to the invention.

One of the big problems in horticulture and agriculture plant propagation is the need to ensure that plant material to be propagated is disease free. Indeed, diseases such as those caused by viral, bacterial or fungal pathogens can have devastating effects on cultures. Currently, the primary way to find out whether plant material is disease free is via a polymerase chain reaction (PCR) diagnostic test. Such tests are extremely laborious and costly, especially when done on hundreds or even thousands of plants that are suspected of having been exposed to an infectious agent. Additionally, even if a disease is detected using these methods, the disease still has to be removed from a culture. The most common method used for this is to isolate the plant meristem and use this part of the plant for propagation. This relies on the assumption that the plant meristem is less likely to have been infected if the infection is caught early enough, and hence growing the plant anew from the meristem increases the likelihood that a plant culture is disease free. However, this is also labour intensive and costly. Additionally, even a single infected cell being present in the isolated meristem, whether from the meristem itself or by contamination, can jeopardise the whole operation. Indeed, even the most precise microscopic isolation of meristems will contain hundreds of plant cells, and the presence of an infectious agent in any single cell will compromise the propagation.

The methods and devices of the invention can be used to solve all of the above problems. In particular, any plant material such as leaves, cotyledons or meristem can be used as a starting source for protoplasts. Further, because the devices and methods of the invention generate single encapsulated protoplasts that can be recovered into full plants with high efficiency, each single plant that is recovered originates from a single cell, and as such is either fully and confidently disease free, or diseased (in which case it can be discarded).

Additionally, the invention's screening capabilities can be used to filter out those diseased protoplasts before they are recovered and grown, thereby ensuring that only disease free plant material is propagated. In embodiments, encapsulated protoplasts are selected based on the presence or absence of a disease marker. For example, an optical output indicating the presence of disease agents, such as a viral, bacterial or fungal pathogens can be used. In embodiments, disease detection methods based on fluorescence or chemiluminescence can be used to detect pathogen presence in single cells (see review e.g. Fang and Ramasamy, 2015).

In embodiments, diagnostic FISH (fluorescence in-situ hybridisation) may be used to detect ribosomal RNA as well as DNA from bacteria or funguses found in single plant protoplasts. In embodiments, diagnostic FISH may be used to detect viral nucleic acids found in single plant protoplasts. Advantageously, such approaches may be able to detect both cultured and non-cultured pathogens. As such, the ability to isolate and grow the pathogen in question is not necessary for detection of the pathogen.

In embodiments, immunofluorescence techniques may be used to detect pathogen derived molecules (e.g. proteins). For example, antibodies with fluorescence tags designed to bind specific disease markers may be used to detect the presence of disease agent.

Using any of the disease detection methods described, the methods and systems of the invention may enable the selection of encapsulated protoplasts that do not show a disease marker. As a consequence, the invention may enable efficient selection and propagation of disease free material.

As the skilled person would understand, any other diagnostic method that produces a light output can be combined with the device invention to obtain efficient screening and selection of disease free plant material.

According to embodiments of the invention, there is provided a diagnostic assay comprising the systems for propagating and selecting plant material according to the invention.

Many plants available commercially are not propagated with seeds, but via tissue culture of cuttings. The process of generating new plantlets from cuttings is very laborious, and often slow. Indeed, the process relies on tissue culture technicians slicing existing plants into tens or hundreds of small tissue samples, which are then placed in tissue culture medium to regenerate. Once small plantlets have grown from the cuttings, the process is repeated one or more times in order to obtain the desired amount of plantlets, typically 100,000 to 10,000,000 units. This process is still highly manual and, hence, very labour intensive, slow and repetitive. Further, each cutting stage is associated with an increased risk of introducing disease into the material.

The methods and devices of the invention can be used to solve all of the above problems. In particular, any plant material such as leaves, cotyledons or meristem can be used as a starting source for protoplasts, and each plant comprises hundreds of millions of cells, the majority of which have the potential to recover into a whole plant using the methods and systems of the invention. The microfluidic chip of the invention allows encapsulation of single plant cells at very high rates, for example 100 to 1000 cells per minute. As explained above, each protoplast being encapsulated with growth promoting buffers enable a high recovery of whole plants when the encapsulated protoplasts are placed in tissue culture conditions. Therefore, the methods and systems of the invention enable the generation of plant units in commercially relevant scales (e.g. 100,000 to 1,000,000 units) using a single, rapid automated step. This considerably reduces the cost, time and labour required to generate the material, as well as significantly reducing the risk of disease introduction.

It can be appreciated that the invention is of particular value with application to plant species representing commercial food or animal fodder crops, commercial biomass or biofuel crops, model plant organisms for laboratory use, medicinal plants, horticultural plants, and rare plants such as endangered, bred, or genetically engineered varieties.

Plant species and genera where the invention is envisioned to be of particular use include, but are not limited to, *Solanum* spp. (e.g. *S. lycopersicum, S. tuberosum, S. melongena, S. muricatum, S. betaceum*); *Brassica* spp. (e.g. *B. oleracea, B. napobrassica, B. napus, B. cretica, B. rupestris* and *B. rapa*); *Capsicum* spp. (e.g. *C. annuum, C. baccatum, C. chinense, C. frutescens, C. pubescens*); *Lupinus* spp. (e.g. *L. angustifolius, L. albus, L. mutabilis* and *L. luteus*);

*Phaseolus* spp. (e.g. *P. acutifolius, P. coccineus, P. lunatus, P. vulgaris* and *P. dumosus*); *Vigna* spp (e.g. *V. aconitifolia, V. angularis, V. mungo, V. radiata, V. subterranea* and *V. unguiculata*); *Vicia faba; Cicer arietinum; Pisum sativum; Lathyrus* spp. (e.g. *L. sativus* and *L. tuberosus*); *Lens* spp. (e.g. *L. culinaris* and *L. esculenta*); *Glycine max; Psophocarpus; Cajanus cajan; Arachis hypogaea; Lactuca* spp. (e.g. *L. sativa, L. serriola, L. saligna, L. virosa* and *L. taterica*); *Asparagus officinalis; Apium graveolens; Allium* spp. (e.g. *A. cepa, A. oschaninii, A. ampeloprasum, A. wakegi, A. porrum, A. sativum* and *A. schoenoprasum*); *Beta vulgaris; Cichorium intybus; Taraxacum officinale; Eruca* spp. (e.g. *E. vesicaria* and *E. sativa*); *Cucurbita* spp. (e.g. *C. argyosperma, C. digitata, C. pepo, C. moschata, C. ecuadorensis, C. ficifolia, C. foetidissima, C. galeottii, C. lundelliana, C. maxima, C. moshata, C. pedatifolia, C. radicans*); *Spinacia oleracea; Nasturtium officinale; Cucumis* spp. (e.g. *C. sativus, C. melo, C. hystrix, C. picrocarpus* and *C. anguria*); *Olea europaea; Daucus carota; Ipomoea batatas; Ipomoea eriocarpa; Manihot esculenta; Zingiber officinale; Armoracia rusticana; Helianthus* spp. (e.g. *H. annuus* and *H. tuberosus*); *Cannabis* spp. (e.g. *C. sativa* and *C. indica*); *Pastinaca sativa; Raphanus sativus; Curcuma longa; Dioscorea* spp. (e.g. *D. rotundata, D. alata, D. polystachya, D. bulbifera, D. esculenta, D. dumetorum, D. trifida* and *D. cayennensis*); *Piper* spp. (e.g. *P. aduncum, P. guineense* and *P. nigrum*); *Zea* spp. (e.g. *Z. mays* and *Z. diploperennis*); *Hordeum* spp. (e.g. *H. vulgare, H. pusillum, H. murinum, H. marinum, H. jubatum* and *H. intercedens*); *Gossypium* spp. (e.g. *G. hirsutum, G. barbadense, G. arboreum* and *G. herbaceum*); *Triticum* spp. (e.g. *T. aestivum* and *T. timopheevii*); *Vitis vinifera; Prunus* sp. (e.g. *P. avium, P. armeniaca, P. cerasifera, P. cerasus, P. domestica, P. persica* and *P. dulcis*); *Malus domestica; Pyrus* spp. (e.g. *P. communis, P. cordata* and *P. pyrifolia*); *Fragaria vesca* and *Fragaria x ananassa; Rubus idaeus; Saccharum officinarum; Sorghum saccharatum; Musa balbisiana* and *Musa x paradisiaca; Oryza sativa; Nicotiana tabacum; Arabidopsis thaliana; Citrus* spp. (e.g. *C. x aurantiifolia, C.×aurantium, C. x latifolia, C. x limon, C. x limonia, C. x paradisi, C. x sinensis* and *C.×tangerina*); *Populus* spp. (e.g. *P. tremula, P. balsamifera* and *P. tomentosa*); *Tulipa gesneriana; Medicago sativa; Abies balsamea; Avena orientalis; Bromus mango; Calendula officinalis; Chrysanthemum balsamita; Dianthus caryophyllus; Eucalyptus* spp. (e.g. *E. leucoxylon, E. maculata, E. polybractea, E. sargentii*); *Impatiens biflora; Linum usitatissimum; Lycopersicon esculentum; Mangifera indica; Nelumbo* spp. (e.g. *N. nucifera* and *N. pentapatala*); *Poaceae* spp.; *Secale cereale; Tagetes erecta*; and *Tagetes minuta*.

The invention will now be further illustrated by way of the following non-limiting examples.

EXAMPLES

Example 1

In this example, the recovery rate (viability) of protoplasts selected using the methods and device of the invention was assessed. This example demonstrates that the methods and apparatus of the invention allow to more efficiently recover full plants from protoplast, compared to that obtainable with a comparative set up.

Methods

Production of protoplasts. *Arabidopsis thaliana* protoplasts were obtained using the protocol described in Yoo, Cho, & Sheen, 2007 and washed in buffer twice to remove any free calcium ions. The washed protoplasts were then resuspended in a first solution to a cell concentration of 200 cells/µl. The first solution comprised 100 mM CaCl2, 100 mM EDTA, 2% w/v Na-alginate and 0.5M Mannitol sterilised by autoclaving.

Figure 4:
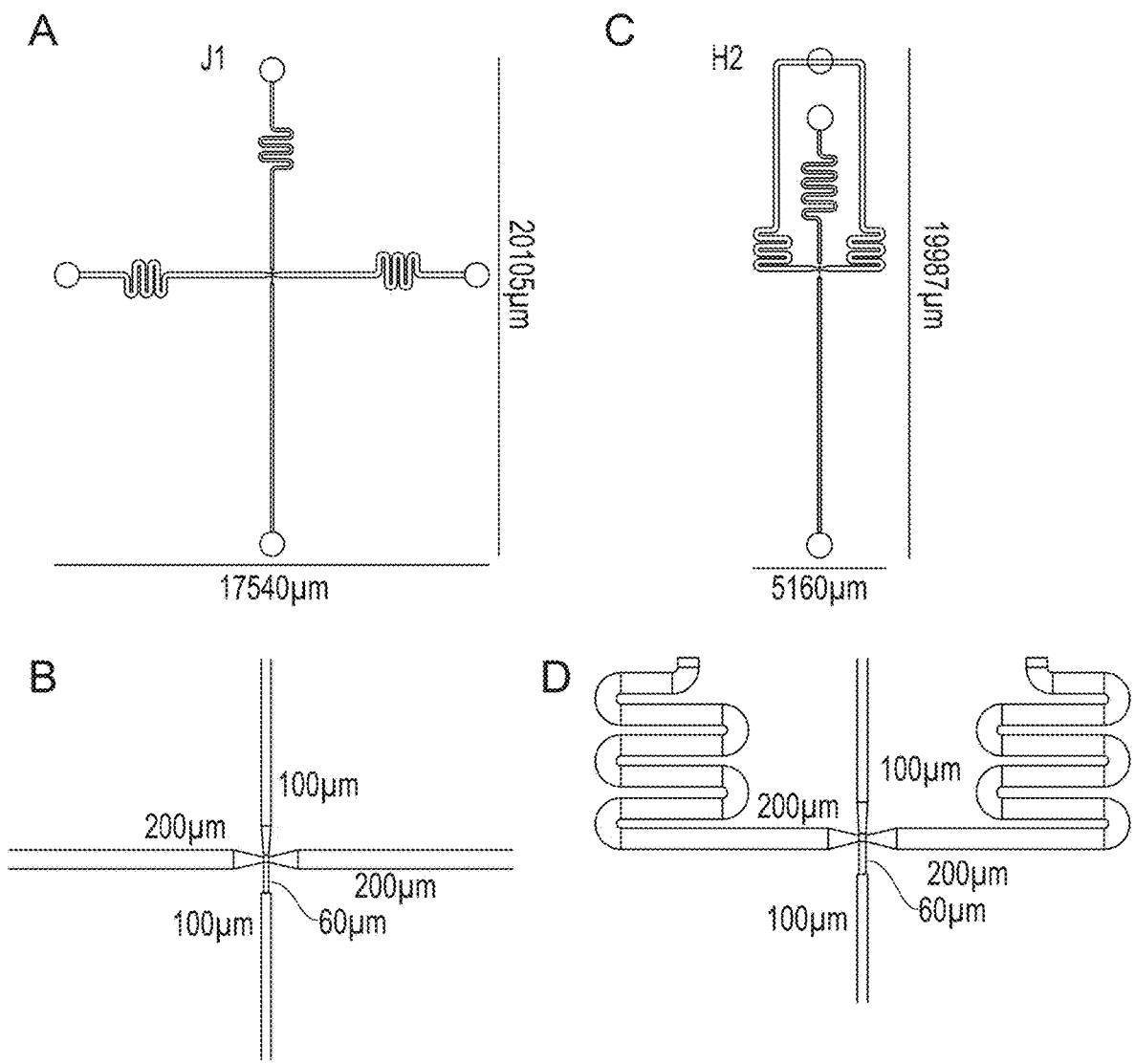
FIGS. 4A-D show chip design schematics for microfluidic devices according to the invention (FIGS. 4A, 4C), and more detailed schematics of the encapsulation zone of the chip of FIGS. 4A and 4C (respectively FIGS. 4B and 4D)

Device fabrication. Microfluidic chips as shown on FIGS. 4A-B (where FIG. 4B shows a more detailed view of the encapsulation zone of the device of FIGS. 4A) and 4C-D (where FIG. 4D shows a more detailed view of the encapsulation zone of the device of FIG. 4C) were obtained. The moulds of the microfluidic chip were developed using standard photolithographic techniques. In particular, photolithography was used to create a negative mould using SU-8 on a silicon wafer. Replicas were obtained using the SU-8 moulds by soft lithography using polydimethylsiloxane (PDMS) (Sylgard 184 Silicone Elastomer Kit; Dow Corning Corporation), and the replicas were adhered to a clean glass slide using plasma bonding.

Encapsulation. Protoplasts suspensions were introduced into the device through the cell loading inlet 22, and a second liquid in the form of mineral oil comprising 0.35% v/v acetic acid and 4% w/w of an emulsifier (in particular Span 80) was introduced in port(s) 24. Both liquids were loaded into 1 ml syringes with a luer lock fitting and poly ether ether ketone (PEEK) biocompatible tubing having an outer diameter of 0.8 mm and an inner diameter of 0.25 mm. The fluxes from the two syringes were independently controlled using syringe pumps, generating a flow of the first liquid (protoplast solution) of 5 µl/hour and a flow of the second solution (oil and acid) of 63 µl/hour. At the junction between the flow of the first liquid (carrying the cells, as well as the encapsulation medium precursor, sodium alginate, and chelated $Ca^{2+}$ ions) and the second liquid (oil and acid), droplets are formed comprising single protoplast, and the calcium ions in the first solution are released due to the lowering pH in the first solution as the acid in the second solution diffuses in the droplets. This in turn causes the alginate present in the first solution to exchange sodium for calcium and gelify at least in an outer layer of each droplet. Gelified droplets were evacuated through a tube connected to output port 44 and collected in a falcon tube comprising mineral oil over a phase of buffer. In such a setup, the gelified capsules sink through the oil and are collected in the buffer.

Culture. The alginate capsules were incubated at room temperature under ambient lighting and sampled for cell division measurements.

Comparative samples. Protoplasts were obtained as explained above and cultured as explained above, without encapsulation.

Figure 5:
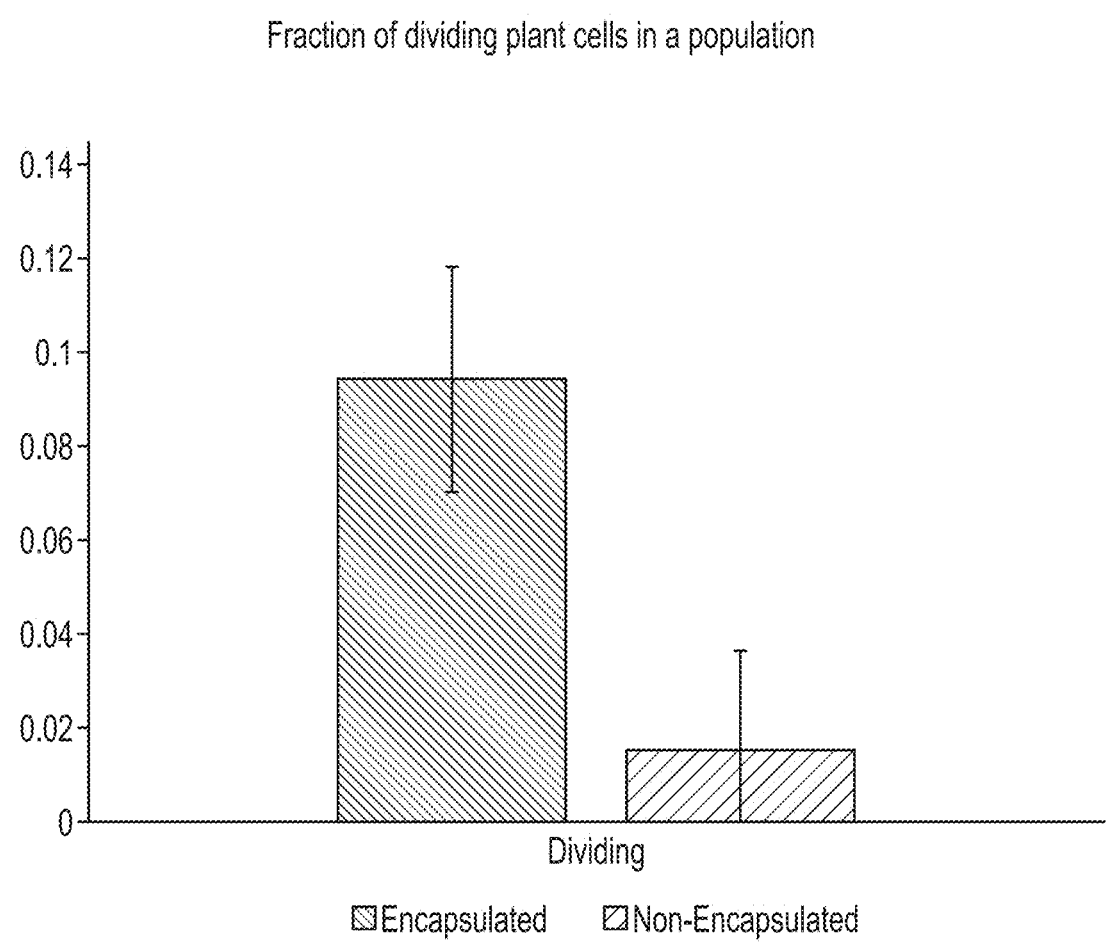
FIG. 5 is a graph showing the fraction of dividing protoplast after 6 days in culture, for samples obtained according to the invention (encapsulated protoplasts) using the device shown on FIGS. 4A-4B and comparative samples comprising non encapsulated protoplasts.

FIG. 5 shows the fraction of dividing protoplast after 6 days in culture, for samples obtained according to the invention (encapsulated protoplasts) using the device shown on FIGS. 4A-5B and comparative samples comprising non encapsulated protoplasts. Two replicates of each condition were obtained and the error bars on FIG. 6 show the 95% confidence interval of the values obtained.

FIGS. 6A-B shows photos of the comparative samples after 5 days in culture. FIGS. 6C-D show photos of the samples obtained according to the invention (i.e. after microfluidic encapsulation), after 5 days in culture. As can be seen on FIGS. 6A-B, the non-encapsulated protoplast culture contains many damaged cells and fragments. By contrast, the encapsulate protoplasts on FIGS. 6C-D comprise healthy dividing cells within the alginate capsules (indicated by the arrows on FIGS. 6C-D). As can be seen on FIG. 6D, the encapsulated protoplasts according to the invention show a re-formed cell wall after 5 days in culture.

The data on FIGS. 5 and 6A-D show that the encapsulation according to the invention increases the likelihood of *A. thaliana* protoplast cells division by 600% after 6 days in culture (FIG. 5) and leads to healthy, dividing cells.

Example 2

In this example, the inventors sought to determine the optimal concentration of acid in the second liquid (a mineral oil, in this particular example) in order to trigger gelification of the alginate in the first liquid, by release of chelated $Ca^{2+}$ ions present in the first liquid. As explained above, gelification of the alginate present in the first solution (protoplast containing solution) is triggered by combination with $Ca^{2+}$ ions. In some embodiments, the first solution comprises Calcium ions but they are bound by the EDTA so are not accessible to the alginate and do not trigger solidification. When the first solution comes into contact with the acidified oil, the acetic acid diffuses into the droplets. The diffusion of acid decreases the pH of the droplets causing the EDTA to fall out of solution and release the calcium ions. Released calcium ions then triggers the solidification of the alginate. Without wishing to be bound by theory, it is believed that lower concentrations of acids are preferable in order to reduce the risk of damage to the protoplasts. However, if the concentration of acid in the second liquid is too low, it may not be sufficient to cause appropriate gelification of the alginate. Preferably, a pH in the droplet of at least 5, at least 5.5, or about 5.7 is used. In embodiments, a pH of at most 6.8 or at most 6.5 is used.

Three 10 ml samples of mineral oil (with 4% Span 80) were acidified with 0.1%, 0.5% and 1% v/v of acetic acid in 15 ml falcon tubes. 5 μl of encapsulation solution (i.e. the first solution but without protoplasts—100 mM CaCl2, 100 mM EDTA, 2% w/v Na-alginate and 0.5M Mannitol sterilised by autoclaving) was added and allowed to sink to the bottom of the oil. Once the encapsulation solution droplet had settled at the bottom, the falcon tube was shaken vigorously to test the integrity (or whether the encapsulation solution had solidified) of the droplet.

Droplets in oil with 0.5% and 1% acetic acid remained intact, whereas droplets in oil with 0.1% v/v of acetic acid did not. Therefore, mineral oil containing 0.25% and 0.35% acetic acid were tested in the same way. The oil containing 0.25% acetic acid did not solidify the alginate but the oil with 0.35% acetic acid did.

The results of this experiment indicate that an acid concentration equivalent to 0.35% acetic acid is sufficient to cause gelification of the alginate in a first solution. As demonstrated in example 1 above, such concentrations do not cause significant damage to protoplasts.

Example 3

In this example, the recovery rate (viability) of tomato (*Solanum lycopersicum*) protoplasts selected using the methods and device of the invention is to be assessed. This example demonstrates that the methods and apparatus of the invention allow more efficient recovery of full plants from protoplast, compared to that obtainable with a comparative set up.

Methods

Production of protoplasts. *Solanum lycopersicum* protoplasts can be obtained using the protocol described in Hossain, Imanishi and Egashira, 1995, and Shahin, 1985 and washed in $CaCl_2$ free TM2 buffer twice to remove any free calcium ions. Subsequent steps, similar to those in Example 1 above, may be carried out. The washed protoplasts can be resuspended in a first solution to a cell concentration of 200 cells/μl. The first solution comprises 100 mM $CaCl_2$, 100 mM EDTA, 2% w/v Na-alginate and 0.5M Mannitol sterilised by autoclaving.

Device fabrication. Microfluidic chips as shown on FIGS. 4A-B (where FIG. 4B shows a more detailed view of the encapsulation zone of the device of FIGS. 4A) and 4C-D (where FIG. 4D shows a more detailed view of the encapsulation zone of the device of FIG. 4C) are to be obtained. The moulds of the microfluidic chip can be developed using standard photolithographic techniques. In particular, photolithography can be used to create a negative mould using SU-8 on a silicon wafer. Replicas can be obtained using the SU-8 moulds by soft lithography using polydimethylsiloxane (PDMS) (Sylgard 184 Silicone Elastomer Kit; Dow Corning Corporation), and the replicas adhered to a clean glass slide using plasma bonding.

Encapsulation. Protoplasts suspensions can be introduced into the device through the cell loading inlet 22, and a second liquid in the form of mineral oil comprising 0.35% v/v acetic acid and 4% w/w of an emulsifier (in particular Span 80) can be introduced in port(s) 24. Both liquids can be loaded into 1 ml syringes with a luer lock fitting and poly ether ether ketone (PEEK) biocompatible tubing having an outer diameter of 0.8 mm and an inner diameter of 0.25 mm. The fluxes from the two syringes can be independently controlled using syringe pumps, generating a flow of the first liquid (protoplast solution) of 5 82 l/hour and a flow of the second solution (oil and acid) of 63 μl/hour. At the junction between the flow of the first liquid (carrying the cells, as well as the encapsulation medium precursor, sodium alginate, and chelated $Ca^{2+}$ ions) and the second liquid (oil and acid), droplets can be formed comprising single protoplast, and the calcium ions in the first solution are released due to the lowering pH in the first solution as the acid in the second solution diffuses in the droplets. This in turn causes the alginate present in the first solution to exchange sodium for calcium and gelify at least in an outer layer of each droplet. Gelified droplets can be evacuated through a tube connected to output port 44 and collected in a falcon tube comprising mineral oil over a phase of buffer. In such a setup, the gelified capsules sink through the oil and are collected in the buffer.

Culture. The alginate capsules can be incubated at room temperature under ambient lighting and sampled for cell division measurements.

Comparative samples. Protoplasts can be obtained as explained above and cultured as explained above, without encapsulation.

REFERENCES

Amini, H., Lee, W. & Di Carlo, D. Inertial microfluidic physics. *Lab Chip* 14, 2739-61 (2014).

Di Carlo, D., Irimia, D., Tompkins, R. G. & Toner, M. Continuous inertial focusing, ordering, and separation of particles in microchannels. *Proc. Natl. Acad. Sci. U.S.A.* 104, 18892-18897 (2007).

Eeckhaut, T., Lakshmanan, P. S., Deryckere, D. et al. Planta (2013) 238: 991. https://doi.org/10.1007/s00425-013-1936-7

Fang Y. and Ramasamy R. P. Biosensors (Basel). 2015 September; 5(3): 537-561. doi: 10.3390/bios5030537

Gi-Hun Lee, Sung-Hwan Kim, Kihoon Ahn, Sang-Hoon Lee and Joong Yull Park, Micromech. Microeng. 26 013003 https://doi.org/10.1088/0960-1317/26/1/013003

Hossain M, Imanishi S and Egashira H (1995) An improvement of tomato protoplast culture for rapid plant regeneration. Plant Cell, Tissue and Organ Culture 42: 141-146, Kahkeshani, S., Haddadi, H. & Di Carlo, D. Preferred interparticle spacings in trains of particles in inertial microchannel flows. J. Fluid Mech. 786, R3 (2016).

Liang, Z. et al. Efficient DNA-free genome editing of bread wheat using CRISPR/Cas9 ribonucleoprotein complexes. Nat. Commun. 8, 14261 doi: 10.1038/ncomms14261 (2017).

Malnoy M, Viola R, Jung M-H, Koo O-J, Kim S, Kim J-S, Velasco R and Nagamangala Kanchiswamy C (2016) DNA-Free Genetically Edited Grapevine and Apple Protoplast Using CRISPR/Cas9 Ribonucleoproteins. Front. Plant Sci. 7:1904. doi: 10.3389/fpls.2016.01904

Shahin, E A (1985) Totipotency of tomato protoplasts. Theor Appl Genet (1985) 69:235-240

Yoo, S.-D., Cho, Y.-H., & Sheen, J. (2007). *Arabidopsis mesophyll* protoplasts: a versatile cell system for transient gene expression analysis. *Nature Protocols*, 2, 1565. Retrieved from https://doi.org/10.1038/nprot.2007.199

Tzu-Keng Chiu, Wen-Pin Chou, Song-Bin Huang, Hung-Ming Wang, Yung-Chang Lin, Chia-Hsun Hsieh & Min-Hsien Wu. Scientific Reports volume 6, Article number: 32851 (2016) doi:10.1038/srep32851

Je Wook Woo, Jungeun Kim, Soon Il Kwon, Claudia Corvalán, Seung Woo Cho, Hyeran Kim, Sang-Gyu Kim, Sang-Tae Kim, Sunghwa Choe & Jin-Soo Kim. Nature Biotechnology volume 33, pages 1162-1164 (2015) doi: 10.1038/nbt.3389Xuan X, Zhu J, Church C. Particle focusing in microfluidic devices. Microfluid Nanofluidics. 9, 1-16 (2010).

Yu Z, Boehm, C R, Hibber J M, Abell C, Haseloff J, Burgess S J & Reyna-Llorens I, Droplet-based microfluidic analysis and screening of single plant cells. bioRxiv, 8 Oct. 2017 (doi: https://doi.org/10.1101/199992).

The invention claimed is:

1. A method for propagating plant material, the method comprising:
   providing a first solution comprising a plurality of plant protoplasts, and comprising an encapsulation medium or encapsulation medium precursor that comprises sodium alginate, wherein the first solution further comprises $Ca^{2+}$ ions, and wherein the $Ca^{2+}$ ions are segregated from the solution in a releasable manner via chelation,
   introducing the first solution into a microfluidic device,
   forming droplets of the first solution in the microfluidic device, at least some of which encapsulate a single protoplast, wherein forming droplets of the first solution in the microfluidic device comprises introducing the first solution comprising the protoplasts in a main channel and introducing a second solution in two side channels that intersect with the main channel within an encapsulation zone, the second solution being immiscible with the first solution, wherein the second solution comprises a non-toxic acid, thereby causing the encapsulation medium or encapsulation medium precursor to gelify in the microfluidic device, and
   collecting the encapsulated protoplasts.

2. The method of claim 1, wherein the method further comprises detecting the presence of a protoplast in a droplet flowing in the microfluidic device and directing droplets that do not contain a protoplast in a separate channel from droplets that contain a protoplast, optionally wherein detecting the presence of a protoplast in a droplet comprises detecting a fluorescent signal associated with chlorophyll.

3. The method of claim 1, wherein the solution of plant protoplast comprises growth promoting agents comprising one or more compounds selected from the group consisting of: salts, vitamins, carbohydrates, auxins, cytokinins, hormones, phytosulfokines, and oligopeptides.

4. The method of claim 1, wherein the non-toxic acid is present in the second solution at a concentration of between about 0.3% by volume and about 2% by volume, between about 0.5% by volume and about 1% by volume, between about 0.35% by volume and about 0.5% by volume, or about 0.35% by volume, or wherein the acid is present at a concentration such that the pH in the droplets is between 5.5 and 5.9.

5. The method of claim 1, further comprising detecting the presence of a desired characteristic associated with the protoplasts flowing through the microfluidic device, and directing droplets containing a protoplast that does not have the desired characteristic in a separate channel from droplets containing a protoplast that does have the desired characteristic.

6. The method of claim 5, wherein detecting the presence of a desired characteristic comprises detecting a fluorescent signal associated with a fluorescent protein.

7. The method of claim 5, wherein detecting the presence of a desired characteristic comprises detecting the presence or absence of a signal indicative of an infection.

8. The method of claim 7, wherein detecting the presence of a signal indicative of an infection comprises detecting a fluorescent or chemiluminescent signal associated with the presence of pathogen nucleic acid or pathogen protein.

9. A method of selecting and propagating disease-free plant material, the method comprising treating a solution of protoplasts with a disease marker, and applying the method of claim 8 to separate, select and propagate plant material.

10. A method of engineering plant material with a desired characteristic, the method comprising genetically modifying a population of protoplasts and applying the method of claim 5 to separate, select and propagate plant material.

11. The method of claim 1, wherein the main channel has a width of between about 50 and about 150 µm, between about 80 and about 120 µm, or about 100 µm; and/or
   wherein the side channels have a width of between about 50 and about 300 µm, between about 100 and about 300 µm, between about 150 and about 250 µm, or about 200 µm; and/or
   the main channel comprises sections immediately preceding and following the encapsulation zone, where the main channel is narrower than in the sections that immediately precede or follow, optionally wherein the narrower sections have a diameter of about 60 µm.

12. The method of claim 4, wherein the pH in the droplets is to 5.7.

13. The method of claim 1, wherein the non-toxic acid is acetic acid.

* * * * *